J. GRAHAM.
CHAIN FOR STRETCHING OR TENTERING FABRICS.
APPLICATION FILED NOV. 7, 1916.
1,280,442.
Patented Oct. 1, 1918.
2 SHEETS—SHEET 1.
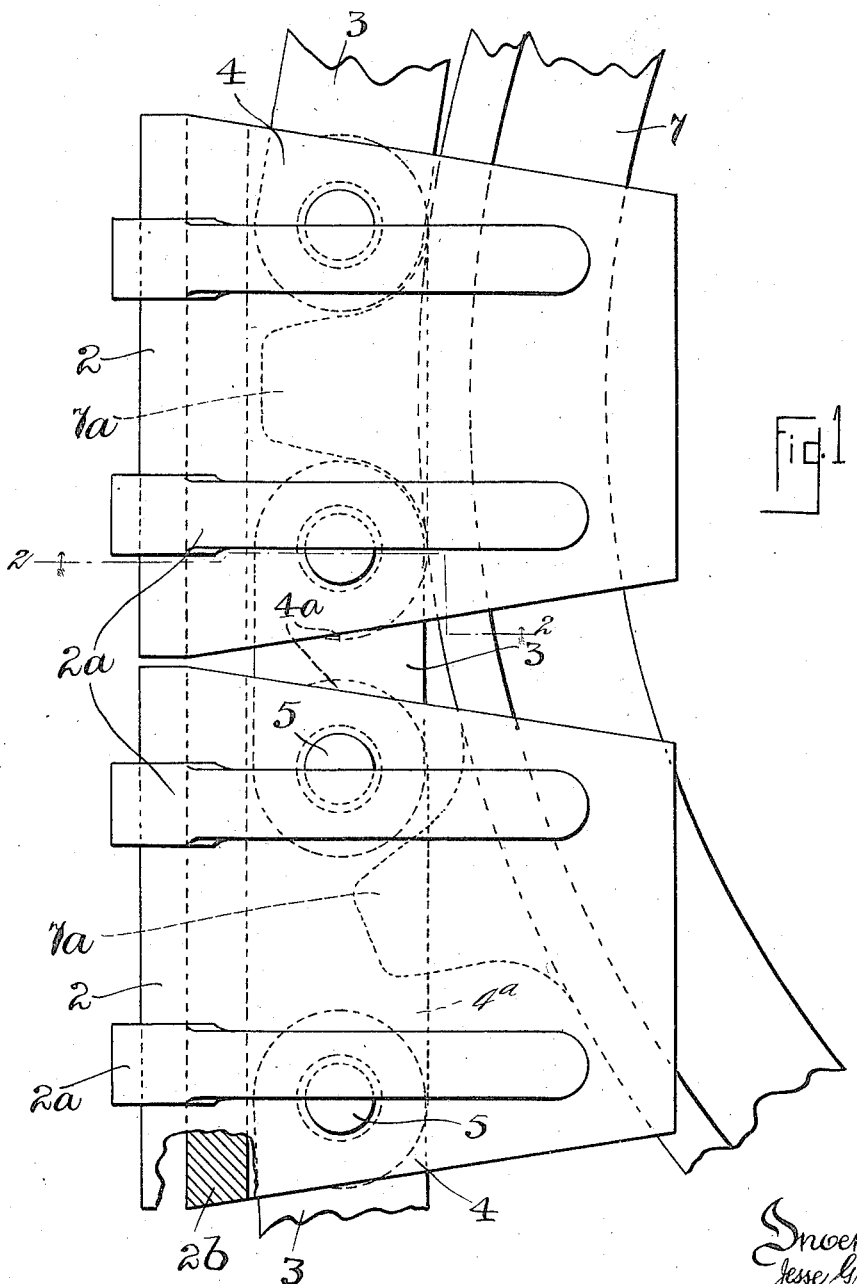

J. GRAHAM.
CHAIN FOR STRETCHING OR TENTERING FABRICS.
APPLICATION FILED NOV. 7, 1916.
1,280,442.
Patented Oct. 1, 1918.
2 SHEETS—SHEET 2.
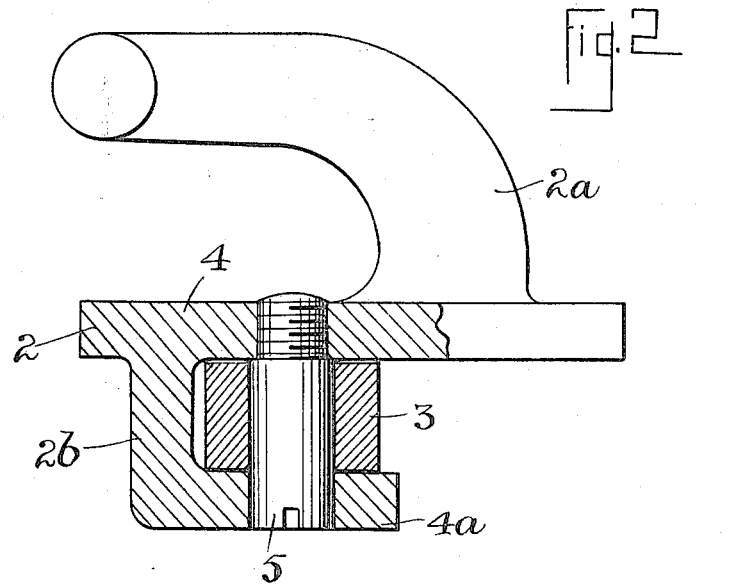
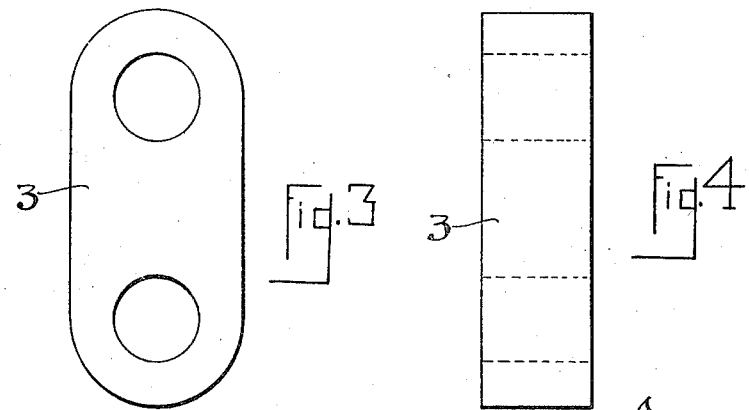
Inventor
Jesse Graham
Wright Brown Quinby & Hay
Attorneys

UNITED STATES PATENT OFFICE.

JESSE GRAHAM, OF LEEDS, ENGLAND, ASSIGNOR TO THE BRADFORD DYERS' ASSOCIATION LIMITED, OF BRADFORD, ENGLAND.

CHAIN FOR STRETCHING OR TENTERING FABRICS.

1,280,442.   Specification of Letters Patent.   Patented Oct. 1, 1918.

Application filed November 7, 1916. Serial No. 129,950.

*To all whom it may concern:*

Be it known that I, JESSE GRAHAM, a subject of the King of Great Britain, and resident of Leeds, in the county of York, England, have invented a certain new and useful Improvement in Chains for Stretching or Tentering Fabrics, of which the following description, having reference to the accompanying sheets of drawings, is a specification.

My invention relates to chains used in machines for stretching or tentering fabrics of the type or class carrying gripping jaws, and the object of my present invention is the production of these chains of such a character as to render them efficient for the purposes for which they are used, and of such construction as to resist wear or deterioration more effectively than those as heretofore produced.

My said invention consists in so constructing the chain of links that each link which carries a gripping jaw is arranged to alternate with a coupling link in such manner that the said coupling link is the part which may be readily detached from or replaced in the chain, while it (said coupling link) and its connecting pins are the only parts in said chain which are subject to excessive wear by the edges of the teeth on the sprocket wheels which operate them, and by other motions incident to the working of the chain.

In the accompanying sheets of drawings:—

Figure 1 is a plan view showing two jaw links, a coupling link connecting said links and parts of two other coupling links, and a portion of a sprocket wheel which actuates the chain, a portion of one of the jaw links being broken away, and a portion of the web hereinafter described being shown in section.

Fig. 2 is a section on line 2—2 of Fig. 1, and an elevation of parts above said line.

Figs. 3 and 4 are plan and edge views of one of the coupling links.

My improved chain is composed of a series of jaw links, hereinafter described in detail, and a series of coupling links 3, the two series of links being assembled to form an endless chain adapted to be driven by the teeth 7ª of a sprocket wheel 7. Each jaw link may be a one piece metal casting, and includes a portion 2 constituting a lower jaw adapted to coöperate with an upper jaw (not shown) in gripping a web of fabric interposed between the jaws.

The jaw link is provided with means for supporting the upper jaw and permitting the latter to move toward and from the lower jaw 2 in a well known manner, and with means for engaging two contiguous coupling links 3, the construction and arrangement being such that the opposed ends of two adjacent coupling links form a space adapted to receive a sprocket wheel tooth 7ª.

As here shown, the jaw link includes an outer ear 4 projecting laterally from and flush with the lower jaw 2, arms 2ª formed on the ear 4 and overhanging the lower jaw 2, said arms constituting supports to which an upper jaw may be pivoted, a flange or web 2ᵇ formed on and projecting inwardly from the lower jaw 2, and an inner ear 4ª formed on said web and spaced from and extending parallel with the outer ear 4.

The ears 4 and 4ª are provided with alined orifices receiving pivot pins 5, one of said orifices and the corresponding end of the pivot pin being preferably screw-threaded, and the opposite end of the pin being preferably slotted to engage a screw driver, provision being thus made for detachably securing the pivot pins to the jaw link. The ends of the coupling links are provided with orifices loosely fitting the pivot pins so that the coupling links may swivel upon said pins. The ears 4 and 4ª form opposite sides of a tooth-receiving space which is open opposite the web 2ᵇ in order that the teeth 7ª of the wheel 7 may pass within said space to come into contact with and operate against the ends of the coupling links 3 as illustrated by Fig. 1. By thus forming the ears, 4, 4ª so that the coupling pins 5 may be passed through the same and fixed and held there against rotation or movement, the said ears are protected against appreciable wear by the actions of the sprocket wheel. The links 3 are of simple formation and contact with the teeth 7ª of the wheel 7, hence the ends of said links 3 and the pins 5 are the only parts where by abrading actions any considerable deterioration takes place.

The links 3 are of such simple formation or shape as to enable them to be produced by the process of stamping and that even out of steel, hence they (said links 3) as well as the pins 5 may be hardened to enable them to further resist wear, while at any time said links 3 and pins 5 may be replaced by others to effect reparation of any deterioration in these parts of the whole chain.

Such being the nature and object of my invention what I claim is:—

1. A chain for stretching or tentering fabrics, comprising a series of jaw links each including a lower jaw, means for supporting an upper jaw, and coupling-link-engaging means, and a series of coupling links each pivoted at its opposite ends to two adjacent jaw links, the adjacent ends of the coupling links being relatively arranged to form sprocket-tooth-receiving spaces.

2. A chain for stretching or tentering fabrics, comprising a series of jaw links each including a lower jaw, means for supporting an upper jaw, and a pair of spaced apart ears, and a series of coupling links each pivoted at its opposite ends to the ears of two adjacent jaw links, the adjacent ends of the coupling links being relatively arranged to form sprocket tooth-receiving spaces.

3. A chain for stretching or tentering fabrics, comprising a series of jaw links each including a lower jaw, means for supporting an upper jaw, and coupling pin-engaging means below the lower jaw, a pair of spaced apart coupling pins detachably connected with said pin-engaging means, and a series of coupling links each engaged at one end with a pin on one jaw link, and at its opposite end with a pin on an adjacent jaw link, the adjacent ends of the coupling links being relatively arranged to form sprocket tooth-receiving spaces.

4. A chain for stretching or tentering fabrics comprising a series of jaw links each including a lower jaw, an outer ear, formed on and projecting laterally from said jaw, supports on said outer ear for an upper jaw, a web formed on and projecting inwardly from said lower jaw, and an inner ear formed on said web and spaced from the outer ear, said ears being provided with alined orifices, coupling pins inserted in said orifices, and a series of coupling links each engaged at one end with a pin on one jaw link and at its opposite end with a pin on an adjacent jaw link, the adjacent ends of the coupling links being relatively arranged to form sprocket tooth-receiving spaces.

JESSE GRAHAM.

Copies of this patent may be obtained for five cents each, by addressing the "Commissioner of Patents, Washington, D. C."